Dec. 20, 1927.
L. D. SOUBIER
GLASS FEEDER
Original Filed April 14, 1923    4 Sheets-Sheet 1
1,653,478
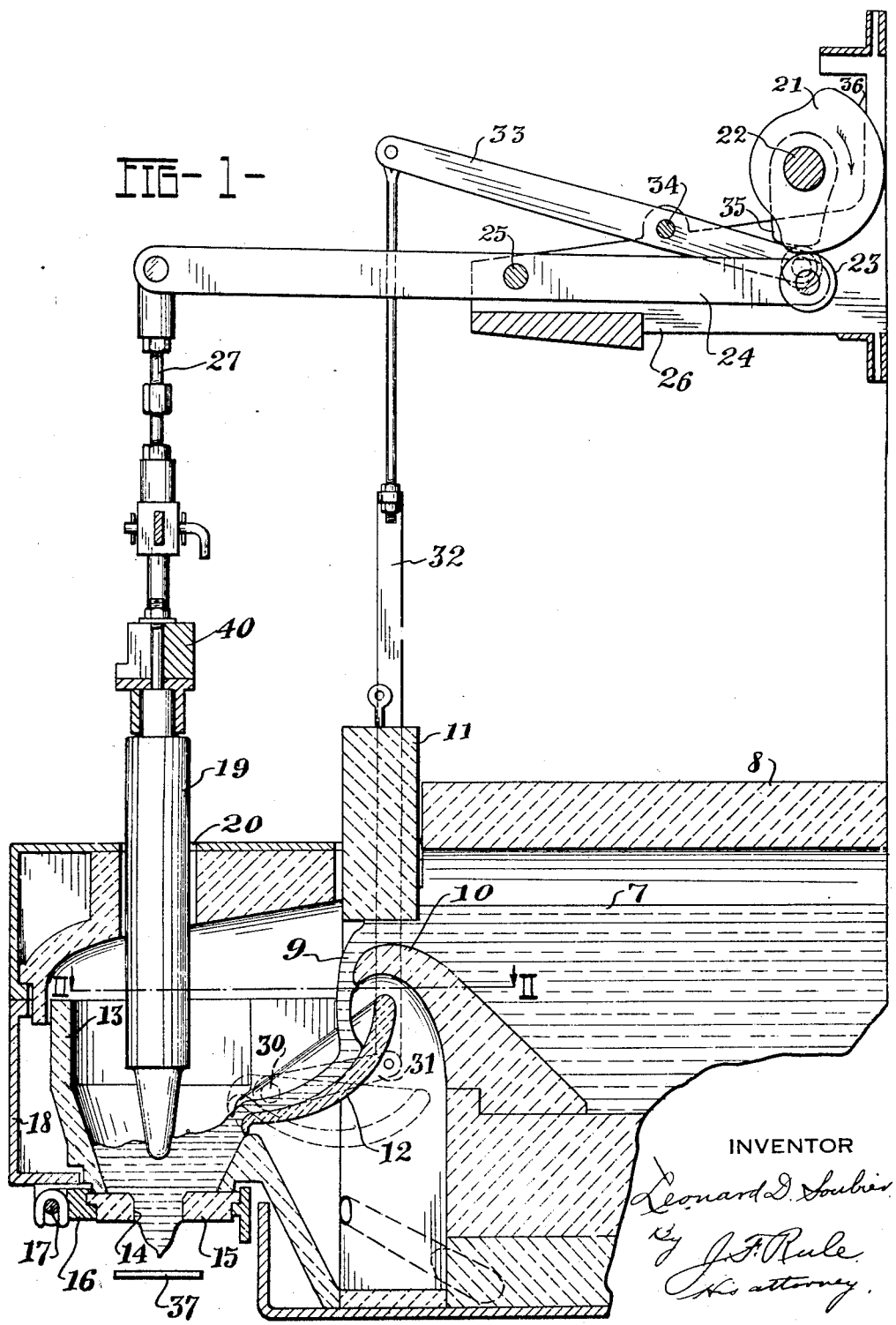
FIG-1-
INVENTOR
Leonard D. Soubier
By J. F. Rule
His attorney Dec. 20, 1927.                                                     1,653,478
                        L. D. SOUBIER
                         GLASS FEEDER
         Original Filed April 14, 1923      4 Sheets-Sheet 2
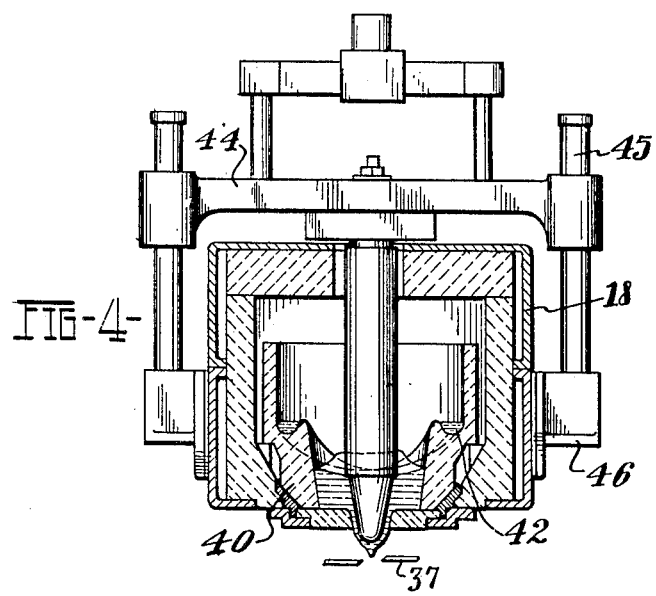
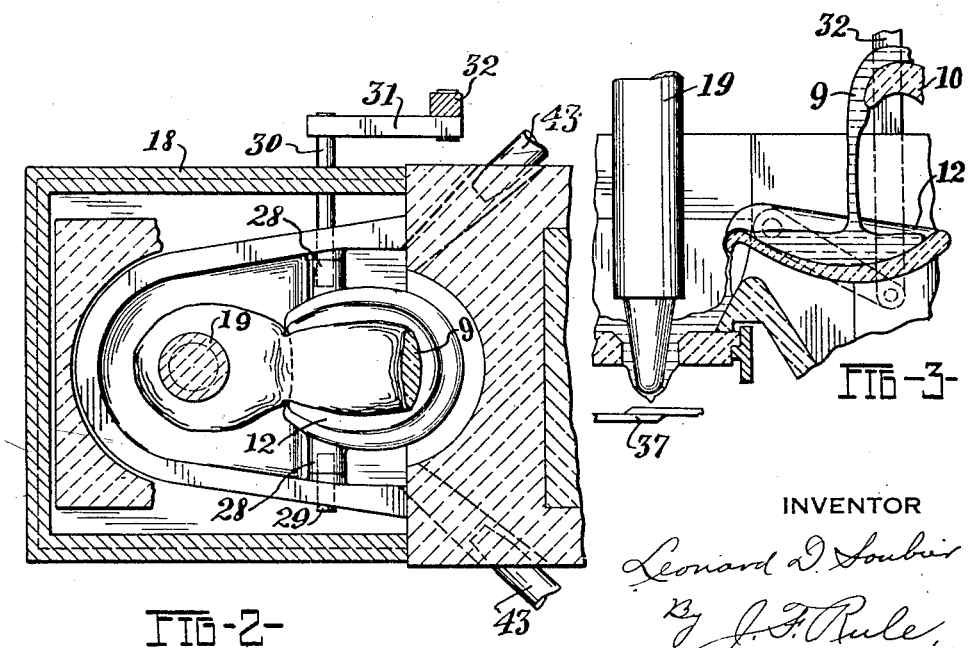
INVENTOR
Leonard D. Soubier
By J. F. Rule,
His Attorney.

Dec. 20, 1927.
L. D. SOUBIER
1,653,478
GLASS FEEDER
Original Filed April 14, 1923    4 Sheets-Sheet 3
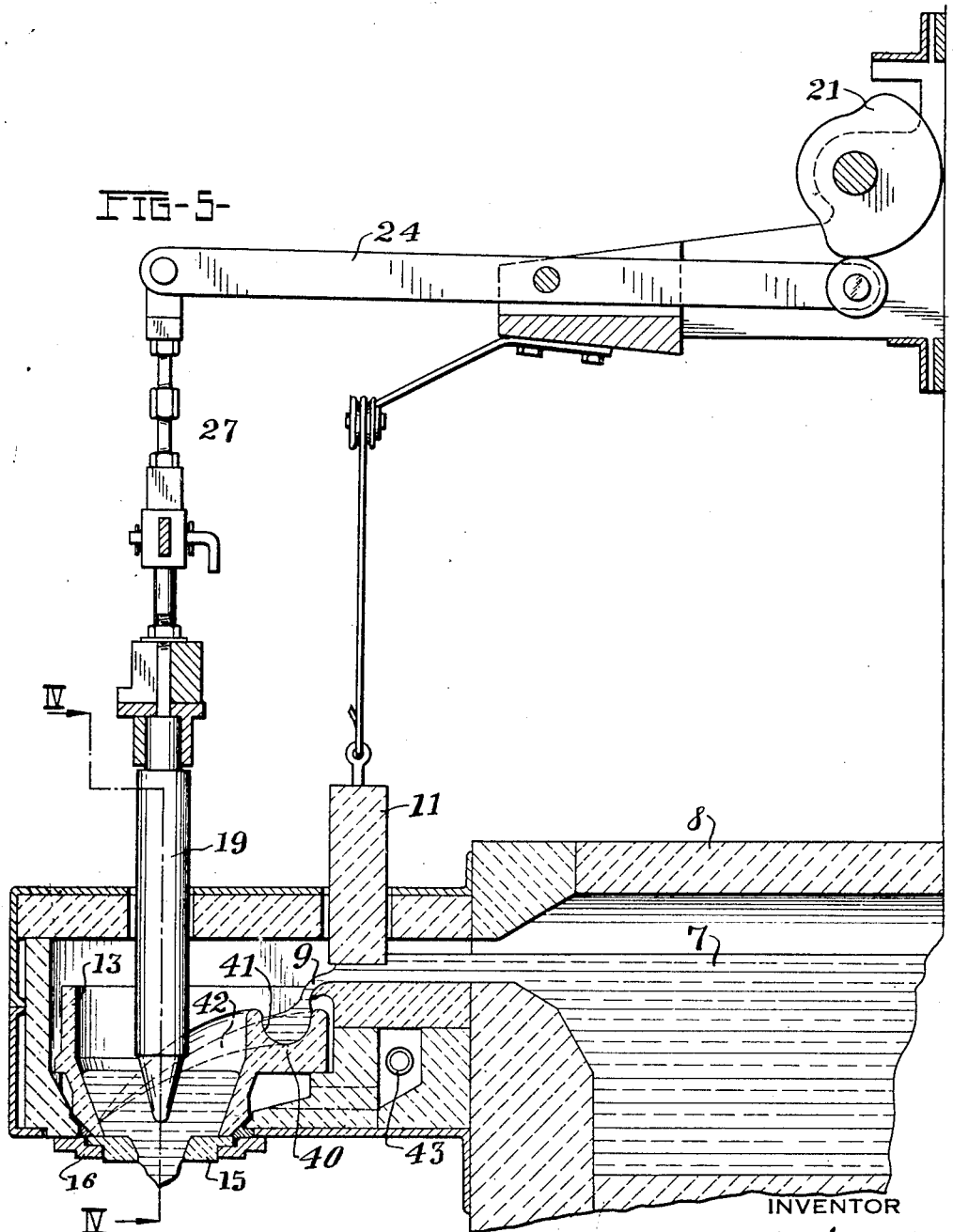

Dec. 20, 1927.
L. D. SOUBIER
1,653,478
GLASS FEEDER
Original Filed April 14, 1923   4 Sheets-Sheet 4
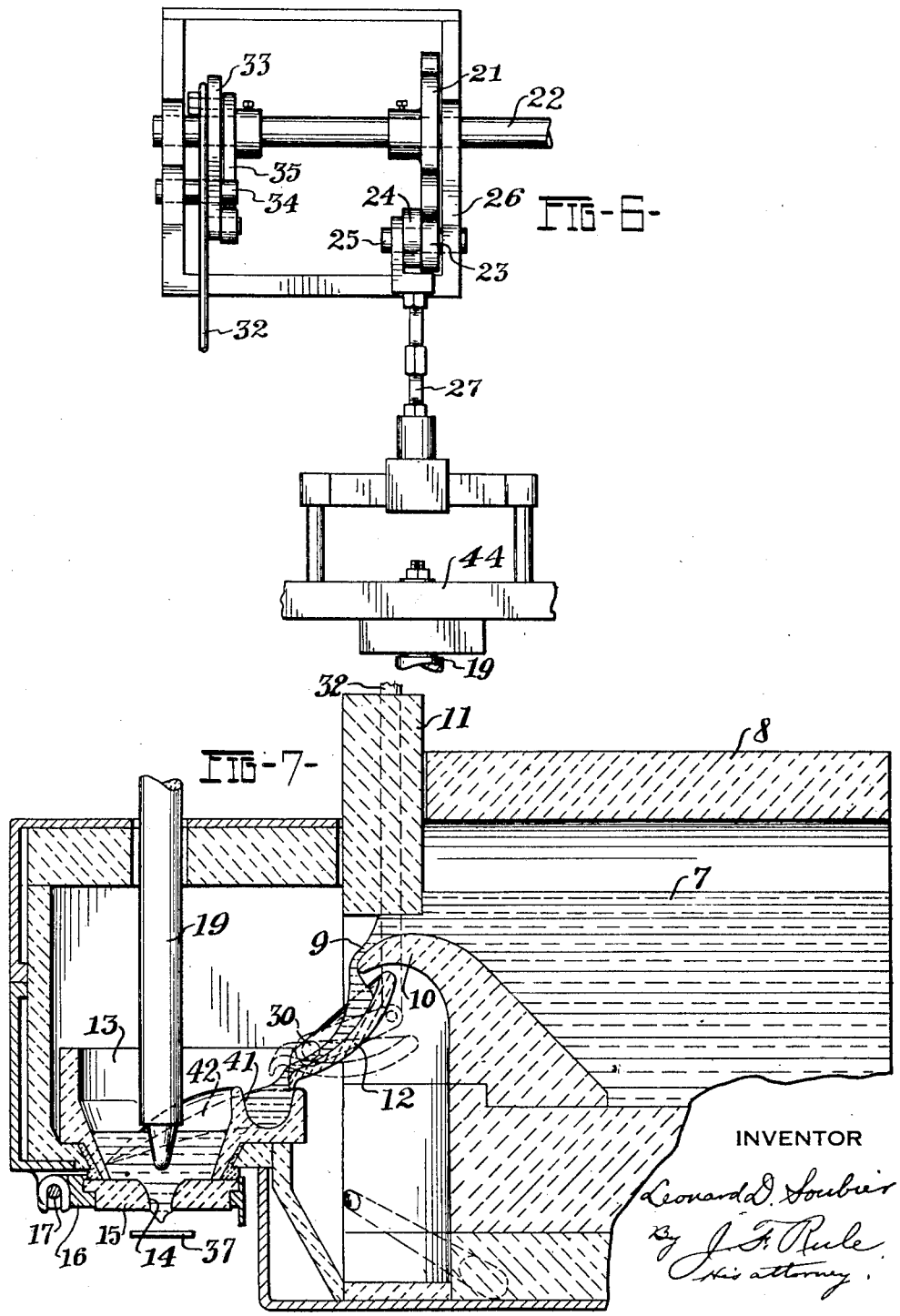
INVENTOR
Leonard D. Soubier
By J. F. Rule
His attorney Patented Dec. 20, 1927.

1,653,478

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed April 14, 1923, Serial No. 631,983. Renewed July 28, 1926.

My invention relates to apparatus for feeding molten glass from a container and delivering it in individual masses or charges adapted for the molds of a glass forming machine. More particularly, the invention relates to the type of glass feeder in which the glass is delivered from a tank or container and enters a discharging receptacle having an outlet opening in the bottom thereof, the flow of glass through said outlet being regulated and controlled by a vertically reciprocating plunger over the outlet.

Among the objects of my invention are, to provide improved means for accurately controlling the flow of glass into the discharging receptacle, and so directing said flow that the glass issuing from the outlet will be free from cold streaks or unevenness in temperature.

Other objects of the invention will appear hereinafter.

In the accompanying drawings:

Figure 1 is a sectional elevation of an apparatus embodying one form of my invention.

Figure 2 is a sectional plan at the line II—II on Figure 1.

Figure 3 is a fragmentary view of a portion of the apparatus shown in Figure 1, but with the operating parts in a different position.

Figures 4 and 5 illustrate a modification. Figure 4 is a section at the line IV—IV on Figure 5. Figure 5 is a vertical section.

Figure 6 is a front view of the cams and associated mechanism for operating the plunger and the transfer device.

Figure 7 is a vertical section of a further modification.

Referring to the form of invention shown in Figures 1, 2 and 3, the molten glass 7 is contained in a refining tank or receptacle 8 from which it flows in a continuous stream 9 over a lip or dam 10 in the front wall of the furnace. The rate at which the glass flows is controlled by a gate 11 adjustable up and down to regulate the size of the outlet through which the glass issues. The stream of glass 9 falls onto a transfer device 12 herein shown as a shallow receptacle or basin forming a temporary holder for the glass. This holder serves as an accumulator and measuring device.

The glass is discharged from the basin 12 into a discharging receptacle 13 having an outlet opening 14 in the bottom thereof. The bottom of the receptacle 13 is formed by a bushing 15 of fire clay or other refractory material supported in a cast iron ring 16 connected by a pivot 17 to a metal casing 18 which surrounds and encloses the receptacle 13. A clay plug or plunger 19 projects vertically downward through an opening 20 in the casing 18 into the glass in the receptacle 13. The plug 19 is periodically reciprocated vertically by means of a cam 21 on a continuously rotating drive shaft 22. The cam engages a roll 23 on a lever 24 pivoted at 25 to a stationary frame 26, said lever having an adjustable connection through a stem 27 and yoke 44 with the plug.

The basin 12 is periodically rocked up and down. For this purpose it is provided with lugs or trunnions 28 (Fig. 2), one of which carries or is journalled on a stud shaft 29, and the other of which is fixed to a rock shaft 30 carrying a rock arm 31 connected through a vertical rod 32 to an operating lever 33. The latter swings about a fulcrum 34 and is operated by a cam 35 keyed to the drive shaft 22. It will be seen that with this construction, the transfer receptacle is swung up and down periodically in synchronism with the movements of the plunger 19. Either or both the cams 21 and 35 may be rotatively adjusted on the shaft 22 to properly time the movements of the cup 12 relatively to those of the plunger, and also to synchronize the operation of the feeder with the movements of the molds to which the charges of glass are delivered.

The operation of the device shown in Figures 1, 2 and 3 is as follows:

As shown in Figure 1, the plunger 19 has just been lifted to its highest position where it is held stationary during a half revolution, more or less, of the cam 21, depending upon the length of the dwell portion 36. The receptacle 12 has also been lifted by its cam 35, permitting the glass which had accumulated thereon to run into the receptacle 13. There is now a substantial head of glass over the outlet 14, so that a downward movement of glass through the outlet is established. The transfer receptacle 12 is only held in its lifted position long enough to discharge the accumulated supply of glass therein and then moves downward to its receiving position (Fig. 3).

After the dwell portion 36 of the cam 21 passes beyond the roll 23, the plunger moves downward, thereby assisting in expelling the glass and controlling the shape of the gob which is suspended from the walls of the orifice 14. After the plunger moves downward, a pair of cutters 37 operate to sever the suspended gob. These cutters may be operated by any well known or approved mechanism, the operation being synchronized with the movements of the plunger.

After the gob is severed, the plunger is again lifted and the transfer cup 12 is also tilted up to discharge the glass which has accumulated during the plunger operations, thereby bringing the parts again to the Figure 1 position. It will be understood that the relative movements and timing of the parts may be varied to meet varying conditions found in practice, and to regulate the size and shape of the gobs.

Figures 4 and 5 show a modification in which a stationary transfer device 40 is interposed between the tank 8 and the discharging receptacle 13. This device comprises a basin or cavity 41 into which the stream of glass 9 flows, said basin being extended to form downwardly inclined channels 42 on opposite sides of the plunger, through which channels the glass is directed into the receptacle 13 at points forward of the plunger. By this arrangement the hot glass is carried to the front of the discharging receptacle 13, thereby preventing an accumulation of cold glass or dog metal in front of the plunger. In this way a uniform temperature of the issuing glass is maintained, cold streaks in the issued glass avoided, and a symmetrical flow of glass through the outlet secured.

Burners 43 may be provided for maintaining a high temperature within the casing surrounding the discharge receptacle 13 and for regulating and controlling the temperature of the issuing glass. The plunger 9 may be supported and guided in its up and down movements, as shown in Figure 4, by a yoke 44 fixed to the plunger and having sliding connections with standards 45 carried by brackets 46 fixed to the casing 18.

Figure 7 illustrates a form of the invention wherein the husbanding cup 12 and the basin 41 are combined in a single structure. With this construction, the cup 12 discharges into the basin 41 instead of directly into the discharging receptacle 13, the cup 12 being operated as described in connection with Figure 1. The basin 41 discharges through its channels 42 into the receptacle 13, the same as described in connection with Figures 4 and 5.

Modifications may be resorted to within the spirit and scope of my invention.

What I claim is:

1. The combination of a container for molten glass, a stationary discharging receptacle having an outlet orifice, and a transfer receptacle between said container and discharging receptacle, said container having an outlet through which molten glass issues in a continuous stream into said transfer receptacle a power element, and means automatically operated thereby for periodically actuating the transfer receptacle to discharge the glass into said discharging receptacle.

2. The combination of a container for molten glass, a discharging receptacle having an outlet orifice, a transfer receptacle between said container and discharging receptacle, said container having an outlet through which molten glass issues in a continuous stream into said transfer receptacle, means within the discharging receptacle operating periodically to control the discharge of glass therefrom, and means to actuate said transfer receptacle periodically in synchronism with the operations of said controlling means.

3. The combination of a container for molten glass having an overflow outlet through which the glass issues in a continuous stream, a discharging receptacle having a discharge opening in the bottom thereof, a transfer receptacle arranged to receive said stream of glass, means for causing a periodic discharge from the transfer receptacle into said discharging receptacle and controlling means operating periodically in synchronism with the operations of said first mentioned means for controlling the discharge from said discharging receptacle.

4. The combination of a container for molten glass having an overflow outlet through which the glass issues in a continuous stream, a discharging receptacle having a discharge opening in the bottom thereof, a transfer receptacle arranged to receive said stream of glass, means for causing a periodic discharge from the transfer receptacle into said discharging receptacle and controlling means operating periodically in synchronism with the operations of said first mentioned means for controlling the discharge from said discharging receptacle, said transfer receptacle being arranged beneath the outlet in said container and above the level of the glass in the discharging receptacle.

5. The combination of a container for molten glass, a stationary receptacle having an outlet opening, a measuring cup into which glass flows from the container, a mechanically operated driving element, and means operated thereby for periodically actuating said cup at predetermined time intervals to deliver glass therefrom to said receptacle.

6. The combination of a container for molten glass, a receptacle having an outlet opening in fixed position, a measuring cup into which glass flows from the container, means for periodically actuating said cup to deliver glass therefrom to said receptacle, a regulating device operating on the glass within the said receptacle to control the discharge of glass through said outlet, and means to periodically actuate the regulating device in synchronism with the movements of the measuring cup.

7. The combination of a container for molten glass having an outlet through which the glass issues in a substantially constant stream, a stationary discharging receptacle, a cup positioned to receive said stream and in which the glass is temporarily accumulated, a power operated driving element, and means operated thereby to periodically actuate said cup at regular intervals to discharge its contents into said receptacle.

8. The combination of a container for molten glass having an outlet through which the glass issues in a substantially constant stream, a discharging receptacle, a cup positioned to receive said stream and in which the glass is temporarily accumulated, means to periodically actuate said cup to discharge its contents into said receptacle, the latter having an outlet opening in the bottom thereof, and a regulator operating periodically in the receptacle in timed relation to the movements of the cup to control the discharge of glass through said outlet.

9. The combination of a container for molten glass from which the glass issues in a constant stream, a discharging receptacle having an outlet opening in the bottom thereof, a cup in position to receive said stream, a power element, and means automatically operated thereby to periodically tilt the cup to discharge the accumulated glass therein into said receptacle.

10. The combination of a container for molten glass from which the glass issues in a continuous stream of substantially constant volume, a discharging receptacle having an outlet opening remaining in a fixed position, a cup positioned to receive said stream, a power element, and means automatically operated thereby to periodically tilt said cup into position to discharge its contents into said receptacle.

11. The combination of a container for molten glass having an outlet through which the glass issues in a stream of substantially constant volume, a discharging receptacle having an outlet opening in the bottom thereof through which the glass is discharged, and automatic means for periodically varying the head of glass in said receptacle over the discharge opening, said means comprising an accumulator to receive said stream of glass, a power element, and mechanism actuated by said power element for periodically tilting the accumulator into position to discharge the glass into said receptacle.

12. The combination of a container for molten glass from which the glass flows in a constant stream, a discharging receptacle located externally of said container and having an outlet opening in the bottom thereof, a plunger projecting into the glass over said opening, a cup in position to receive said stream of glass, means to periodically tilt the cup to discharge the glass, and means providing a channel through which the glass discharged from the cup is directed past the plunger and discharged into said receptacle.

13. The combination of a container for molten glass from which the glass flows in a constant stream, a discharging receptacle located externally of said container and having an outlet opening in the bottom thereof, a plunger projecting into the glass over said opening, a cup in position to receive said stream of glass, means to periodically tilt the cup to discharge the glass, and means providing a channel in position to receive the glass discharged from said cup, said channel comprising downwardly and forwardly inclined branches through which the glass flows on opposite sides of the plunger and is delivered to said discharging receptacle.

14. The combination of a furnace tank to contain molten glass, a discharging receptacle located externally of the tank and provided with an outlet opening in the bottom thereof, a regulator projecting into the glass above said opening, means to periodically reciprocate said regulator, and means including separate channels arranged to direct a flow of glass from the tank to opposite sides of and past said regulator before it enters said receptacle.

Signed at Toledo, in the county of Lucas and State of Ohio, this 10th day of April, 1923.

LEONARD D. SOUBIER.